United States Patent
Luo et al.

(10) Patent No.: US 11,765,728 B2
(45) Date of Patent: Sep. 19, 2023

(54) METHOD AND DEVICE FOR RESOURCE ALLOCATION AND RELEASE IN WIRELESS SIDELINK COMMUNICATION

(71) Applicant: ZTE Corporation, Guangdong (CN)

(72) Inventors: Wei Luo, Guangdong (CN); Lin Chen, Guangdong (CN); Boyuan Zhang, Guangdong (CN); Weiqiang Du, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/962,280

(22) Filed: Oct. 7, 2022

(65) Prior Publication Data

US 2023/0050943 A1   Feb. 16, 2023

Related U.S. Application Data

(63) Continuation of application No. PCT/CN2020/083906, filed on Apr. 9, 2020.

(51) Int. Cl.
| | |
|---|---|
| *H04W 72/00* | (2023.01) |
| *H04W 72/20* | (2023.01) |
| *H04W 76/38* | (2018.01) |
| *H04W 76/27* | (2018.01) |
| *H04W 72/542* | (2023.01) |
| *H04W 88/06* | (2009.01) |

(52) U.S. Cl.
CPC ......... *H04W 72/20* (2023.01); *H04W 72/542* (2023.01); *H04W 76/27* (2018.02); *H04W 76/38* (2018.02); *H04W 88/06* (2013.01)

(58) Field of Classification Search
CPC ... H04W 72/20; H04W 72/542; H04W 76/27; H04W 76/38; H04W 88/06

USPC .................................................... 455/452.1
See application file for complete search history.

(56) References Cited

U.S. PATENT DOCUMENTS

| | | | |
|---|---|---|---|
| 2020/0154501 A1* | 5/2020 | Cheng | H04W 4/70 |
| 2021/0337509 A1* | 10/2021 | Selvanesan | H04L 1/189 |

FOREIGN PATENT DOCUMENTS

| | | |
|---|---|---|
| CN | 105246027 A | 1/2016 |
| CN | 110771257 A | 2/2020 |
| CN | 110944306 A | 3/2020 |

OTHER PUBLICATIONS

ZTE; "eNB involvement in remote UEs authorization and connection establishment"; 3GPP TSG RAN WG2 #91; R2-153768; Beijing, P.R. China, Aug. 24-28, 2015; 3 pages.

International Search Report dated Dec. 29, 2020 for International Application No. PCT/CN2020/083906.

Written Opinion dated Dec. 29, 2020 for International Application No. PCT/CN2020/083906.

* cited by examiner

*Primary Examiner* — Huy C Ho

(74) *Attorney, Agent, or Firm* — Crowell & Moring, L.L.P.

(57) ABSTRACT

This disclosure relates to methods and devices for wireless sidelink resource allocation for a user equipment (UE) assisted by an anchor UE. Various mechanisms are disclosed for handling releasing of the anchor UE initiated by either the anchor UE or the assisted UE, and for handling sidelink resources already allocated to the UE by the anchor UE prior to the release. Additional mechanisms are disclosed for using an anchor UE to assist in allocating sidelink resources to multiple UEs configurable in a shared manner or non-shared manner.

20 Claims, 7 Drawing Sheets

METHOD AND DEVICE FOR RESOURCE ALLOCATION AND RELEASE IN WIRELESS SIDELINK COMMUNICATION

CROSS REFERENCE

This application is a continuation of and claims priority to International Patent Application No. PCT/CN2020/083906, filed Apr. 9, 2020, which is herein incorporated by reference in its entirety.

TECHNICAL FIELD

This disclosure is directed generally to wireless communications and particularly to sidelink communication resource allocation, configuration, and release.

BACKGROUND

User equipments in a wireless network may communicate data with one another via direct sidelink communication channels without the data being relayed by any wireless access network nodes. In some application scenarios of sidelink communications such as those involving vehicular wireless network devices, communication resource allocation and configuration for one communication terminal may involve another communication terminal in addition to a base station. It is critical to provide a resource allocation, provisioning, and release mechanism to enable low-power and efficient use of sidelink communication resources.

SUMMARY

This disclosure is directed to methods, systems, and devices related to wireless communication, and more specifically, to resource allocation, configuration, and release in sidelink communication between communication terminals.

In one embodiment, a method for releasing resource allocation assistance in wireless sidelink communication by a first user equipment (UE) is disclosed. The method may include determining, after an association between the first UE and a second UE is established for the second UE to assist the first UE in sidelink resource allocation, a release indication indicating that the first UE no longer needs the second UE to assist in the sidelink resource allocation; and transmitting, upon the determination of the release indication, a release information to the second UE for indicating to the second UE that the first UE no longer need the second UE to assist in the sidelink resource allocation or that a mode for the sidelink resource allocation for the first UE has changed.

In another embodiment, another method for releasing resource allocation assistance in wireless sidelink communication by a first UE is disclosed. The method may include determining, after an association between the first UE and a second UE is established for the first UE to act as an anchor UE to assist the second UE in sidelink resource allocation, a release indication indicating that the first UE is no longer assisting the second UE in the sidelink resource allocation; and transmitting a release information to the second UE for indicating to the second UE that the first UE is no longer assisting the second UE in the sidelink resource allocation In another embodiment, a method for obtaining assistance in sidelink communication resource allocation by a first UE from a second UE is disclosed. The method may include transmitting a request for assistance in sidelink communication resource allocation to the second UE; receiving a sidelink communication resource allocation information sent by the second UE in response to receiving the request; and selecting from allocated resources indicated by the sidelink communication resource allocation information.

In another embodiment, a method for assisting a second UE in wireless sidelink resource allocation by a first UE is disclosed. The method may include transmitting, by the first UE, a sidelink message indicating the first user equipment can assist another user equipment in sidelink resource allocation; receiving, by the first UE, the sidelink assistance request message; and transmitting, by the first UE, a response to the received sidelink assistance request message to the second UE to indicate that the first UE can assist the second UE in sidelink resource allocation. The sidelink message may include at least one of a mode of resource allocation for the second UE comprising at least one of a mode for resource schedule by a serving cell, a mode for resource allocation by UE autonomous selection, a semi-persistent resource allocation/scheduling mode, a dynamic resource allocation/scheduling mode, a mode for multi-shot resource allocation mode, or single shot resource allocation mode; an indication of a radio access technology (RAT) of the first UE; or a PC5 RAT supported by the first UE.

In another embodiment, a method for wireless sidelink resource allocation for a first UE is disclosed. The method may include receiving, by the first UE, a sidelink configuration message indicating a plurality of modes of sidelink resource allocation that can be simultaneously used by the first UE; and obtaining a sidelink resource allocation, by the first UE, via two or more of the plurality of modes of sidelink resource allocation. The plurality of modes of sidelink resource allocation may include two or more of a mode for resource allocation by a serving cell, a mode for resource allocation by UE autonomous resource selection, or a mode for resource allocation via assistance from a second UE Various devices are further disclosed. Each of these devices includes a processor and a memory, wherein the processor is configured to read computer code from the memory to implement any one of the methods above.

Computer-readable media are further disclosed. Each of the computer-readable media includes instructions which, when executed by a computer, cause the computer to carry out any one of the methods above.

The above and other aspects and their implementations are described in greater detail in the drawings, the descriptions, and the claims below.

DETAILED DESCRIPTION

Figure 1:
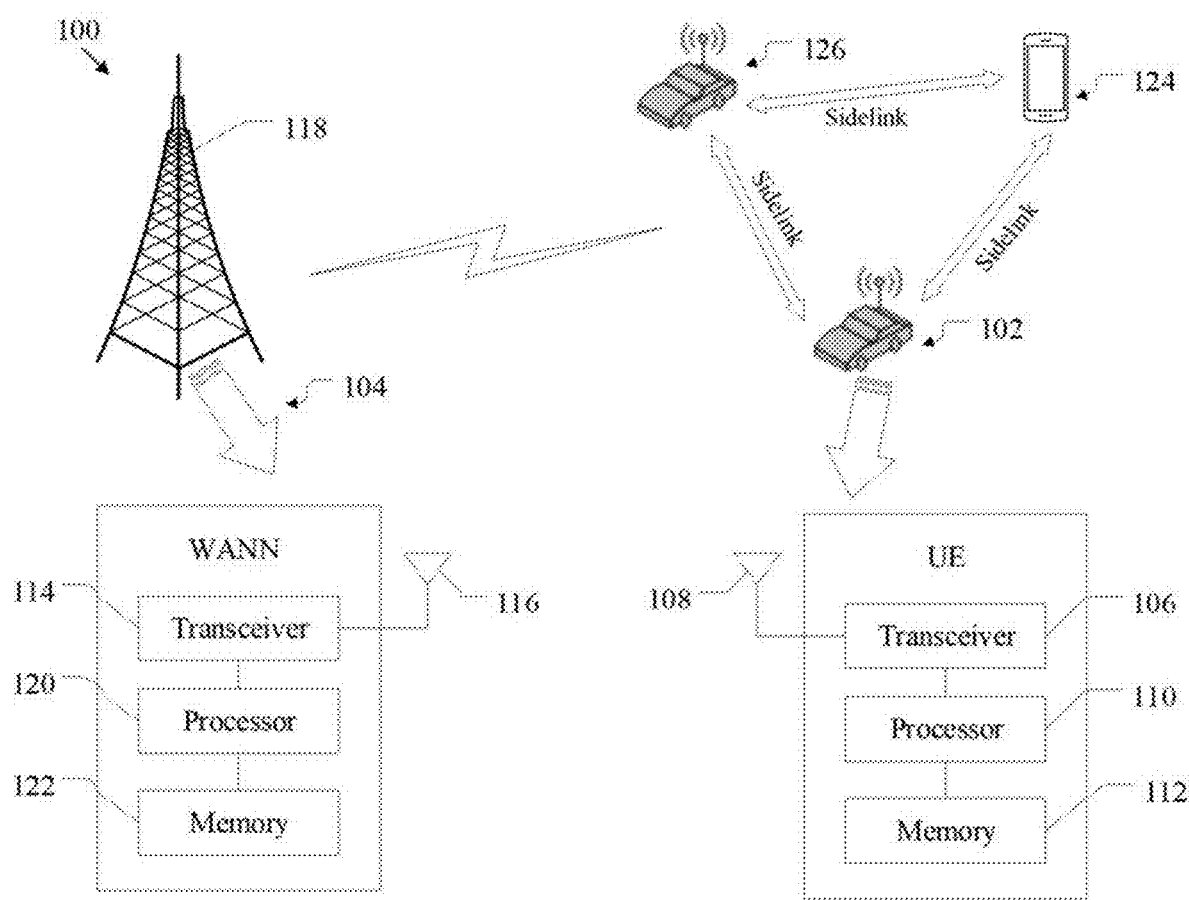
FIG. 1 illustrates an example diagram of a wireless communication network in accordance with various embodiments.

The technology and examples of implementations and/or embodiments in this disclosure can be used to improve performance in wireless communication systems. The term "exemplary" is used to mean "an example of" and unless otherwise stated, does not imply an ideal or preferred example, implementation, or embodiment. Section headers are used in the present disclosure to facilitate understanding and do not limit the disclosed technology in the sections only to the corresponding section. Please note that the implementations may, however, be embodied in a variety of different forms and, therefore, the scope of this disclosure or claimed subject matter is intended to be construed as not being limited to any of the embodiments set forth below. The various implementations may be embodied as methods, devices, components, or systems. Accordingly, embodiments of this disclosure may, for example, take the form of hardware, software, firmware or any combination thereof.

A vehicle network refers to a network system for wireless communication and information exchange among vehicles, pedestrians, roadside equipments, and the Internet and other data networks in accordance with various communication protocols and data exchange standards. Vehicle network communication helps improve road safety, enhance traffic efficiency, and provide broadband mobile data access and inter-network node data exchanges. The vehicle network communication may be categorized into various types as differentiated according to the communication endpoints, including but not limited to vehicle-to-vehicle (V2V) communication, vehicle-to-infrastructure/vehicle-to-network (V2I/V2N) communication, and vehicle-to-pedestrian (V2P) communication. These types of communication are referred to, collectively, as vehicle-to-everything (V2X) communication.

Such a vehicle network may heavily rely on sidelink communication between the terminal devices or user equipments (UEs) in the network. Sidelink communication, as used in this disclosure, refers to a direct wireless information exchange between UEs. For example, V2X communication may rely on direct sidelink data exchange from a source UE to a destination UE via an air interface without forwarding by any wireless base station. Such mode of communication has been researched and implemented in the 3rd Generation Partnership Project (3GPP). An example V2X subsystem based on sidelink communication technology is illustrated as part of FIG. 1 and may be referred to as, for example, PC5-based V2X communication or V2X sidelink communication.

The application scenarios for V2X communication has increasingly expanded and diversified. Advanced V2X services and applications include but are not limited to vehicle platooning, extended sensors, semi-autonomous driving, fully autonomous driving, and remote driving. These applications and services require increasingly higher network performance including broader bandwidth, lower latency, and higher reliability. For example, these applications and services may require that the underlying sidelink communication technology support communication data packets of 50 to 12000 bytes in size, message transmission rates of 2 to 50 messages per second, maximum end-to-end delays of 3 to 500 milliseconds, transmission reliability of 90% to 99.999%, data transmission rates of 0.5 to 1000 Mbps, and signal ranges of 50 to 1000 meters, depending on specific data services needed for these applications.

While being capable of communicating among themselves using sidelinks, the various UEs described above may also be connected to wireless access networks, and to a core network via the access networks. The wireless access network and core network may be involved in configuring and provisioning communication resources needed for data and control information transmission/reception for sidelink communication. An example wireless access network may be based on, for example, cellular 4G LTE or 5G NR technologies and/or formats. FIG. 1 shows an example system diagram of a wireless access communication network 100 including UEs 102, 124, and 126 as well as a wireless access network node (WANN) 104. Each of the UEs 102, 124, and 126 may include but is not limited to a mobile phone, a smartphone, a tablet, a laptop computer, a vehicle on-board communication equipment, a roadside communication equipment, a sensor device, a smart appliance (such as a television, a refrigerator, and an oven), or other devices that are capable of communicating wirelessly over a network. The UEs may indirectly communicate with each other via the WANN 104 or directly via sidelinks. As shown in FIG. 1, each of the UEs such as UE 102 may include transceiver circuitry 106 coupled to an antenna 108 to effectuate wireless communication with the WANN 104 or with another UE such as UE 124 or 126. The transceiver circuitry 106 may also be coupled to a processor 110, which may also be coupled to a memory 112 or other storage devices. The memory 112 may store therein computer instructions or code which, when read and executed by the processor 110, cause the processor 110 to implement various ones of the methods for sidelink resource allocation/configuration/release and data transmission/reception described herein.

Similarly, the WANN 104 may include a base station or other wireless network access points capable of communicating wirelessly over a network with one or more UEs and communicating with a core network. For example, the WANN 104 may be implemented in the form of a 4G LTE base station, a 5G NR base station, a 5G central-unit base station, or a 5G distributed-unit base station. Each type of these WANNs may be configured to perform a corresponding set of wireless network functions. The WANN 104 may include transceiver circuitry 114 coupled to an antenna 116, which may include an antenna tower 118 in various forms, to effectuate wireless communications with the UEs 102, 124, and 126. The transceiver circuitry 114 may be coupled to one or more processors 120, which may further be coupled to a memory 122 or other storage devices. The memory 122 may store therein instructions or code that, when read and executed by the processor 120, cause the processor 120 to implement various functions. These functions, for example, may include those related to the sidelink resource allocation, configuration, provisioning and releases described below.

For simplicity and clarity, only one WANN and three UEs are shown in the wireless communication access network 100. It will be appreciated that one or more WANNs may exist in the wireless communication network, and each WANN may serve one or more UEs. While the UEs 102, 124, and 126 of FIG. 1 are shown as being served within one serving cell, they may alternatively be served by different cells and/or by no cell. While various embodiments of sidelink communication below are discussed in the context of the particular example cellular wireless communication access network 100, the underlying principle apply to other types of wireless communication networks.

Sidelink communication among the various UEs of FIG. 1 may support co-existence of various distinct communication cast types including unicast, group-cast (or multicast), and broadcast. In conventional technologies, the UEs deployed in the access network 100 may be required to perform exhaustive monitoring of a large range of sidelink wireless resources in either unicast, group-cast, or broadcast mode, thereby incurring a large power consumption. Such power consumption may be at an unacceptably high level for some low power UEs. To counter such problems, a low-power UE may request another UE to serve as an anchor UE to assist in allocating sidelink resources for the low-power UE. In such a manner, the anchor UE that is less limited by power consumption may take charge of monitoring and sensing the sidelink transmission resource pools to provide assistance in sidelink resource allocation for the low-power UE. Accordingly, the low power UE can reduce its frequency and amount of sensing and monitoring of the sidelink communication resource pools. The term "anchor UE" is used in this disclosure to indicate an assistance role of the UE in resource allocation for other UEs.

While the various implementations below may benefit resource allocation and release for low-power UEs, the underlying principles apply to sidelink resource allocation and release for any other UEs.

The various embodiments described below relate to example procedures for (1) one UE to establish an assistance relationship with an anchor UE to obtain assistance in sidelink resource allocations, (2) release of such assistance relationship under various conditions, and (3) selection of configured sidelink resources allocated from the anchor UE by the UE being assisted.

First Embodiment (Procedure for Assisted Sidelink Resource Allocation by an Anchor UE)

Figure 2:
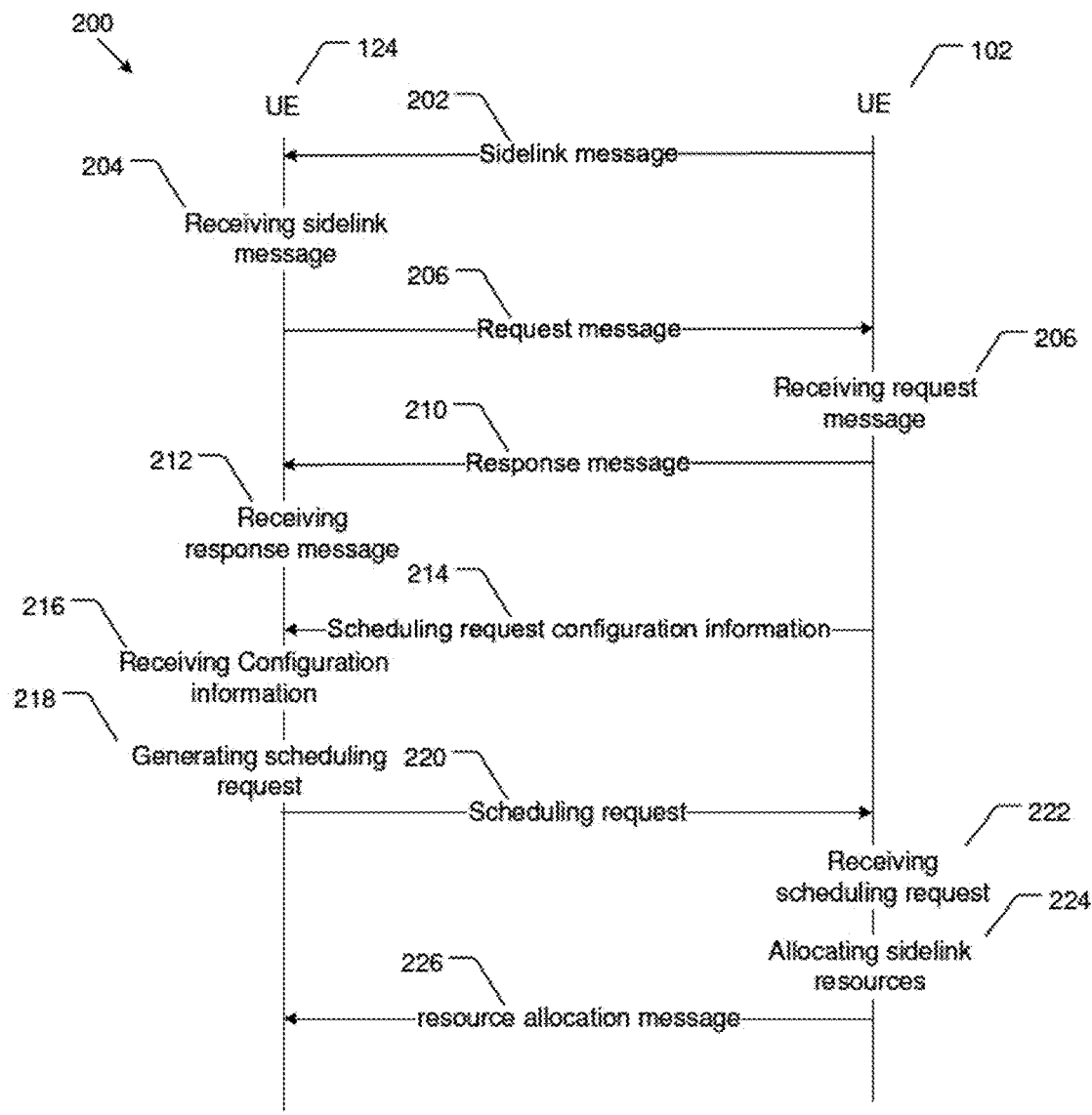
FIG. 2 illustrates an example logic follow for an anchor UE to assist another UE in sidelink resource allocation.

As an example, this embodiment describes communication procedures between the UE 102 and the UE 124 of FIG. 1 in order for the UE 102 to act as an anchor UE to assist in allocating sidelink resources for the UE 124 with reference to FIG. 2. It is assumed that UE 102 qualifies for serving as an anchor UE. Example procedures for establishing UE 102 as being qualified for serving as an anchor UE are described in PCT International Application No. PCT/CN2020/077568 filed with the Chinese Patent Office on Mar. 3, 2020 by the same Applicant as this current patent application and entitled "Device and Methods for Allocating Resources for Sidelink Transmission," which is herein incorporated by reference in its entirety.

As shown in FIG. 2, the anchor UE 102 may transmit a sidelink message indicating that the UE 102 is serving as an anchor user equipment (202). The sidelink message may be carried in a sidelink broadcast message, a sidelink group-cast message, a sidelink radio resource control (RRC) message, a PC5-MIB message, or a sidelink control information message. Accordingly, the sidelink message may be transmitted to the UE 124 in the manner of broadcast, group-cast, or unicast.

In some implementations, the sidelink message may include, for example, access control information with respect to the UE 102. The access control information may include, for example, a channel quality between UE 102 and a cell serving the UE 102, a current load rate of the UE 102, a number of user equipments for which the UE 102 is assisting in allocating sidelink resources, a geographical location identification of the UE 102, and a quality of service supported by the UE 102.

Additionally or alternatively, the sidelink message may include, for example, a mode of resource allocation for the UE 124. Such a model of resource allocation may include but is not limited to a mode for resource allocation by a serving cell, a mode for resource allocation by UE autonomous selection, a semi-persistent resource allocation/scheduling mode, a dynamic resource allocation/scheduling mode, a mode for multi-shot resource allocation mode; or single shot resource allocation mode.

Additionally or alternatively, the sidelink message may include an indication of a current a ratio access technology (RAT) of a current Uu interface between the UE 102 and its serving cell, including but not limited to E-UTRAN technology, new radio (RN) technology or double-link connection technology.

Alternatively or additionally, the sidelink message may include a PC5 radio access technology supported by the UE 102.

Alternatively or additionally, the sidelink message may include, for example, an indication that the UE 102 supports relay function or road side unit function. The sidelink message may further include, for example, destination identity indicating that the UE 102 is capable of assisting in allocating sidelink resources for sidelink transmission of the UE 124 having such a destination identity, a quality of service information indicating that the UE 102 is capable of assisting in allocating sidelink resources for sidelink transmission of the UE 124 with such a quality of service information, a transmission type indicating that the UE 102 is capable of assisting in allocating sidelink resources for sidelink transmission of the UE 124 of such a transmission type, a serving cell identifier indicating a cell serving the UE 124, a number of allocable resources in a sidelink transmission resource pool, a CBR of the transmission resource pool, and a resource usage rate indicating a rate of allocated resources to allocable resources in the transmission resource pool.

As further shown by 204 of FIG. 2, the UE 124 may receive the sidelink message indicating that the UE 102 is serving as an anchor user equipment. Upon receiving the sidelink message, the UE 124 may transmit to a request message requesting for assisting in allocating sidelink resources for the UE 124 to the UE 102 (206). The request message may include, for example, an identifier of the UE 124, power saving information of the UE 124, sidelink destination index or destination identity to be used by the UE 124 in sidelink transmission, sidelink source index or source identity to be used by the UE 124 in sidelink transmission, sidelink quality of service information to be used by the UE 124 in sidelink transmission, coverage state information indicating that the UE 124 is in coverage or out of coverage of any wireless access network node, a serving cell identifier indicating a cell serving the UE 124, a frequency information list to be used to be used by the UE 124 in sidelink transmission, and a sidelink transmission type/cast type to be used by the UE 124 in sidelink transmission.

As shown in 208 of FIG. 2, the UE 102 may receive the request message from the UE 124. In response to the request message, the UE 102 may transmit a response message indicating whether to assist in allocating sidelink resources for the UE 124 to the UE 124 (210).

As further shown in 212 of FIG. 2, the UE 124 may receive the response message from the UE 102. The response message may indicate that the UE 102 would assist in allocating sidelink resources for the UE 124. Such a response message may include, for example, the following information to facilitate the UE 124 in obtaining sidelink resource allocation via the anchor UE 102:

scheduling request configuration set information, which indicates the resource configuration for the UE 124 to transmit scheduling request to the UE 102, destination identity list, which indicates that the UE 102 is capable of assisting in allocating sidelink resources for sidelink transmission of the second user equipment with one or more destination identities in the destination identity list, a quality of service information, which indicates that the UE 102 is capable of assisting in allocating sidelink resources for sidelink transmission of the UE 124 with the quality of service information, a transmission type or cast type, which indicates that the UE 102 is capable of assisting in allocating sidelink resources for sidelink transmission of the UE 124 in such a transmission or cast type, and a range of HARQ process ID list indicating that the UE 102 is capable of assisting in allocating sidelink resources for sidelink transmission of the UE 124 with a HARQ process ID within the range of HARQ process ID list.

Optionally, the response message may further include, for example, information on transmission resource pool for the UE 124.

Optionally, as indicated by 214 of FIG. 2, where the response message indicates that the UE 102 would assist in allocating sidelink resources for the UE 124, the UE 102 may separately transmit the scheduling request configuration information to the UE 124. The scheduling request configuration may be used by the UE 124 to construct a scheduling request.

As shown by 216 of FIG. 2, the UE 124 may receive the scheduling request configuration information from the UE 102. Then, when the UE 124 needs to perform a sidelink transmission, the UE 124 may generate a scheduling request for the sidelink transmission based on the received scheduling request configuration information, as shown in 218, and transmit the scheduling request to the UE 102, as shown in 220.

In response to receiving the scheduling request as shown in 222, the UE 102 may, for example, allocate sidelink resources in the transmission resource pool for the UE 124 as shown in 224, and transmit the resource allocation message including information of the allocated sidelink resources to the UE 124, as shown in 226.

Alternatively, the UE 102 may transmit a buffer status report configuration information to the UE 124 at 214. The UE 124 may then generate a buffer status report based on the buffer status report configuration information (at 218) and transmit the buffer status report to the UE 102 (at 220). In response to receiving the buffer status report, the UE 102 may for example, allocate sidelink resources in the transmission resource pool of the UE 124 (224) and transmit the resource allocation message including information of the allocated sidelink resources to the UE 124 (226).

Optionally, prior to transmitting to the UE 102 the request message requesting for assisting in allocating sidelink resources for the UE 124 (206), if the UE 124 is covered by a WANN such as the WANN 118, the UE 124 may transmit a radio resource signaling (RRC) message to the WANN 118. The RRC message may carry, for example, at least one of identifier of the UE 124, identifier of cell serving the UE 124, power saving information of the UE 124, sidelink destination index or destination identity to be used by the UE 124 in sidelink transmission, sidelink quality of service information to be used by the UE 124 in sidelink transmission, frequency information list to be used by the UE 124 in sidelink transmission, or sidelink transmission/cast type to be used by the UE 124 in sidelink transmission.

Then, the UE 124 may receive a RRC message from the WANN 118. The RRC message may indicate whether the UE 124 is allowed to obtain sidelink resource allocation via the UE 102.

Optionally, the RRC message may include, for example, information on transmission resource pool, which indicates the range of transmission resource pool of the UE 124. The RRC message may further include, for example, a transmission type indicating that the UE 102 is capable of assisting in allocating sidelink resources for sidelink transmission of the user equipment in the transmission type;

a destination identity indicating that the UE 102 is capable of assisting in allocating sidelink resources for sidelink transmission of the UE 124 with the destination identity;

a sidelink quality of service information indicating that the UE 102 is capable of assisting in allocating sidelink resources for sidelink transmission of the UE 124 with the sidelink quality of service information; and a range of HARQ process id list indicating that the UE 102 is capable of assisting in allocating sidelink resources for sidelink transmission of the UE 124 with a HARQ process id within the range of HARQ process id list.

Optionally, prior to transmitting, to the UE 124, the response message indicating whether to assist in allocating sidelink resources for the UE 124 (210), the UE 102 may transmit an RRC message to the WANN 118 to request for the authorization to assist in allocating sidelink resource for the UE 124. The RRC message may include, for example, one or more identification information of the UE 124, power saving information of the UE 124; sidelink destination index or destination identity in which the UE 124 is interested, in sidelink transmission; sidelink quality of service information to be used by the UE 124 in sidelink transmission; frequency information list in which the UE 124 is interested, in sidelink transmission; and sidelink transmission/cast type to be used by the UE 124 in sidelink transmission.

Then, the UE 102 may receive, from the WANN 118, an RRC message indicating whether to authorize or allow the UE 102 to assist in allocating sidelink resources for the UE 124. The RRC message may further include, for example, an identification information of user equipments indicating that the UE 102 could assist in allocating sidelink resources for the user equipments, information on a transmission resource pool indicating that the UE 102 assists to allocate sidelink resources in the transmission resource pool, scheduling request configuration set information to configure scheduling request resources for the UE 124, a range of Hybrid Automatic Repeat Request (HARQ) process id list indicating that the UE 102 is capable of assisting in allocating sidelink resources for sidelink transmission of the UE 124 with a HARQ process id within the range of HARQ process id list.

destination identity indicating that the UE 102 is capable of assisting in allocating sidelink resources for sidelink transmission of the UE 124 with the destination identity, a quality of service information indicating that the UE 102 is capable of assisting in allocating sidelink resources for sidelink transmission of the UE 124 with the quality of service information, a transmission type indicating that the UE 102 is capable of assisting in allocating sidelink resources for sidelink transmission of the UE 124 in the transmission type, and a list of sidelink radio bearers (SLRB) or logic channels indicating that the UE 102 is capable of assisting in allocating sidelink resources for the sidelink radio bearers or logic channels of the UE 124.

In some other implementations, the UE 124 may support multiple mode of sidelink resource allocation. For example, the UE 124 may receive a sidelink configuration message indicating a plurality of modes of sidelink resource allocation that can be simultaneously used by the UE 124. The UE 124 may then determine a set of modes of sidelink resource allocation among the plurality of sidelink resource allocation; and use the set of modes of sidelink resource allocation simultaneously to obtain sidelink resource allocation for sidelink communication. The plurality of modes of sidelink resource allocation may include two or more of a mode for resource allocation by a serving cell, a mode for resource allocation by UE autonomous resource selection, or a mode for resource allocation via assistance from a second UE. Optionally, the UE 124 may further receive an indication information for indicating PC5 RATs and simultaneous modes of sidelink resource allocation supported by each of the PC5 RATs or a cross RAT indication information for indicating simultaneous modes of sidelink resource allocation supported by cross RAT. Optionally, the UE 124 may further receive a priority information indicating a relative priority among the plurality of modes of sidelink resource allocation.

Second Embodiment (Determining Candidate Anchor UEs and Selecting an Anchor UE from the Candidate Anchor UEs)

By way of examples, this embodiment describes the manners in which the UE 124 selects a specific user equipment such as the UE 102 to assist in allocating sidelink resources for the UE 124 when multiple user equipments are available to serve as an anchoring user equipment to assist in allocating sidelink resources for the UE 124. Once the UE 124 selects a particular UE to serve as its anchor user equipment, the example sidelink resource allocation assistance procedure described in the first embodiment above applies.

The UE 124 may receive sidelink messages from a plurality of user equipments such as the UEs 102 and 126. The sidelink messages may indicate that the user equipments sending the sidelink messages can serve as anchor user equipments and may include information indicating qualification to serve as anchor user equipments. Such a sidelink message may include the various information discussed above in relation to 202 of FIG. 2 as applied to UE 102 or UE 126. Additionally or optionally, such a sidelink message may include an indication whether the user equipment sending the sidelink message is a group header of sidelink communication group. Then, based on the sidelink messages, the UE 124 may identify which one of the plurality of user equipments is a group header of a sidelink communication group of which the UE 124 is a member. If such user equipment is identified, the UE 124 may directly select that head user equipment to assist in allocating sidelink resources for the UE 124.

Alternatively or additionally, the UE 124 may first select candidate user equipments meeting a predetermined candidate condition from the plurality of user equipments based on the sidelink messages. The predetermined candidate condition may include, for example, at least one of the following items:

loading rate of a candidate user equipment being lower than a loading rate threshold, a number of user equipments which a candidate user equipment is assisting in allocating sidelink resources is lower than a number threshold, channel quality of a candidate user equipment is higher than a channel quality threshold, a range of quality of services supported by a candidate user equipment includes a quality of service of a sidelink data that the UE 124 is to transmit, resource available for allocation by a candidate user equipment is more than a resource availability threshold, resource usage rate of resources to be allocated by a candidate user equipment is lower than a resource usage rate threshold, a CBR of a transmission resource pool of a candidate user equipment is lower than a CBR threshold, a list of sidelink group communication destination identifiers includes a sidelink group communication destination identifier of sidelink data that the UE 124 is to transmit, a candidate user equipment and the UE 124 belong to a same sidelink communication group, a geographical distance between a candidate user equipment and the UE 124 is less than a geographical distance threshold, or a candidate user equipment and the UE 124 are being served in a same cell.

Then, the UE 124 may select one of the candidate user equipments satisfying one or more of the conditions above to assist in allocating sidelink resources for the UE 124. The selection from the candidate user equipments may be based on the selected candidate user equipment meeting a predetermined selection condition, which may include, for example one of the following conditions:

the candidate user equipment is a group header of a sidelink communication group.

the candidate user equipment has a best channel quality between the candidate user equipment and a cell serving the candidate user equipment or between the candidate user equipment and the UE 124, the candidate user equipment and the UE 124 belong to a same sidelink communication group, the candidate user equipment and the UE 124 are being served in a same cell, a resource allocation mode of the candidate user equipment is wireless access network node scheduling mode, the candidate user equipment has a most resources available to be allocated, the candidate user equipment has a lowest resource usage rate with respect to resources to be allocated by the candidate user equipment, a transmission resource pool of the candidate user equipment has a lowest channel busy ratio, the candidate user equipment supports a road side unit function, or the candidate user equipment supports a relay function.

Optionally, before selecting the candidate user equipments meeting predetermined criteria from the plurality of user equipments, the UE 124 may receive the predetermined criteria from the WANN 118. For example, the UE 124 may receive, from the WANN 118, the metric values such as the loading rate threshold, the number threshold, the channel quality threshold, a range of quality of services supported by the user equipment, and the geographical distance threshold. Alternatively, the metric values may be pre-configured in the UE 124.

Third Embodiment (Releasing an Anchor UE from Assisting in Sidelink Resource Allocation)

The UE 124 of FIG. 1 may select, for example, the UE 102 as the anchor UE and obtain assistance in sidelink resource allocation from the UE 102 following the various procedures described above in the first embodiment and the second embodiment. The connection between the UE 124 and the UE 102, for example, may be implemented as a unicast connection (even though connections of other cast types may be feasible). When such a connection is released and thus UE 124 and UE 102 is effectively disconnected, the responsibility of UE 102 as being the anchor UE for the UE 124 may be correspondingly released. In other words, after the connection between the UE 124 and the UE 102 is released, the UE 102 would no longer act as the anchor UE for assisting the UE 124 in sidelink resource allocation.

For example, such a connection between the UE 124 and the anchor UE 102 may time out (e.g., a T400 timeout) or a sidelink RRC reconfiguration may fail, e.g., as indicated by a sidelink radio link control (RLC) entity that a maximum number of retransmissions for a specific destination has been reached. In either of these and some other situations, the connection between the UE 102 and the UE 124 may be considered as being released. Then the UE 102 is no longer considered as the anchor UE for assisting the UE 124 in sidelink resource allocation.

However, in some situations, there may be no data transmission between the anchor UE 102 and the UE 124 for a long period of time. The connection between the UE 124 and the UE 102 may have lost already during that period of time (e.g., because the distance between the UE 124 and UE 102 has grown to be too large), yet such disconnection may be undetected because there has been no data transmission and thus no detectable T400 timeout and no detectable RRC reconfiguration failure. In such situations, the UE 102 may still be considered as the anchor UE for the UE 124 even though the connection between the UE 102 and the UE 124 has been lost. Therefore, to provide more efficient resource allocation, it may be desirable to have a separate mechanism for releasing the UE 102 from being the anchor UE for the UE 124.

Figure 3:
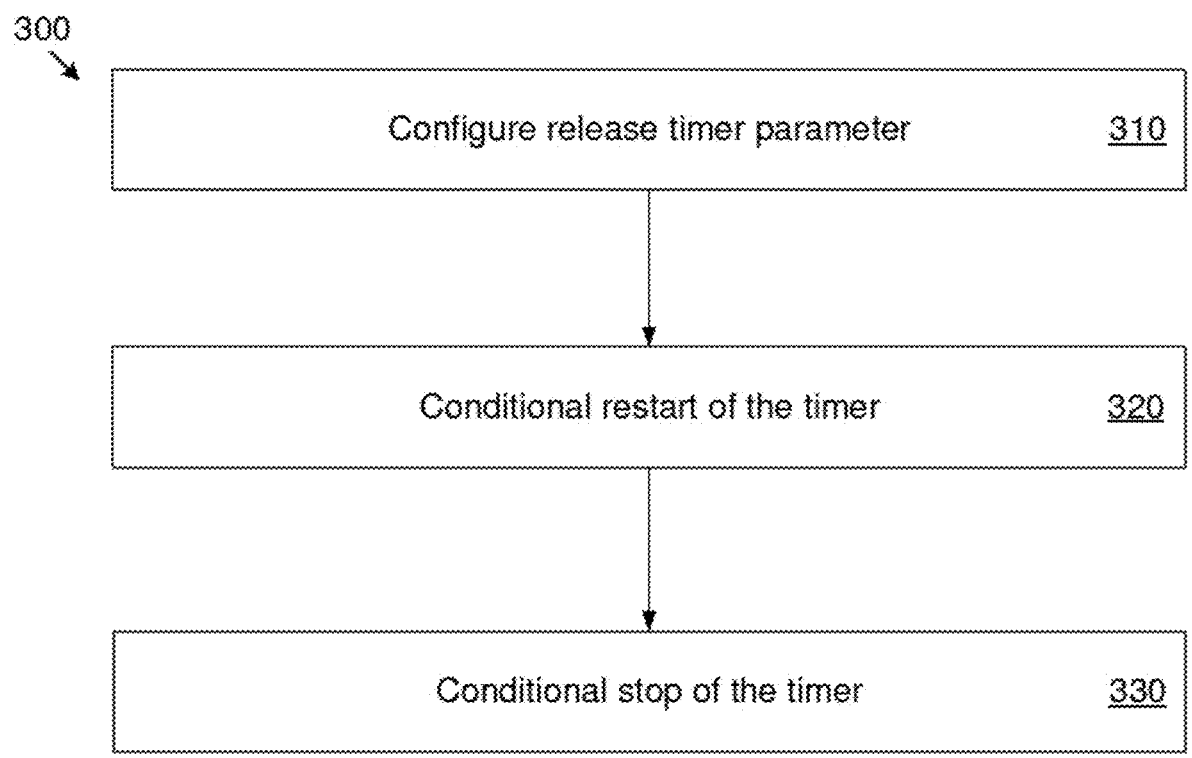
FIG. 3 illustrates an example logic follow for configuring, restarting, and deactivating a timer used in a procedure for releasing an anchor UE from assisting a second UE in sidelink resource allocation.

In some implementations, a timer may be used to provide a separate mechanism for releasing the UE 102 from acting as the anchor UE for the UE 124. Such a timer may be referred to as a release timer. The release timer may be configured, activated (restarted) and deactivated (stopped) according to logic flow 300 of FIG. 3. For example, as shown, by 310, the release timer may be initially configured with a predefine time parameter. Such time parameter may be obtained from a serving cell of either the UE 124 or the anchor UE 102. Alternatively the initial time parameter may be pre-configured in the UE 124 or UE 102. As shown in 320, the release timer may be conditionally restarted (e.g., to count down from the initial value) at various stage. For example, the release timer may be restarted when or after the UE 124 transmits a sidelink scheduling request (SR) or buffer status report (BSR) to the UE 102, e.g., at 220 of FIG. 2. Alternatively, the timer may be restarted when the UE 124 transmits a sidelink information or sidelink UE assistant information included in, for example, the sidelink request message 206 of FIG. 2. As further shown by 330, the activated release timer may be conditionally deactivated (e.g., stopped from counting down). For example, the release timer may be deactivated (stopped) when the UE 124 receives sidelink resource allocation from the anchor UE 102.

The release timer may be monitored as it counts down. The release of the UE 102 from being the anchor UE for the UE 124 may then be triggered when the timer expires. Such a trigger due to the timer expiry may be implemented in parallel to other release mechanisms or triggers. These other release triggers, for example, my include but are not limited to when the UE 124 enters an RRC sidelink connection state,
when the UE 124 receives a configuration information from its serving cell indicating that the first UE is to transmit sidelink communication based on network scheduling, that the first UE is to transmit sidelink communication based on autonomous resource selection of the first UE,
when the UE 124 a configuration information from its serving cell indicating that it is no longer allowed to use other UEs to assist in allocating sidelink resources,
when the UE 102 is no longer qualify to service as an anchor UE for assisting other UEs in sidelink resource allocation,
when the serving cell of the UE 102 indicates to the UE 102 that it cannot serve as an anchor UE for assisting other UEs in sidelink resource allocation, When any of the conditions above is triggered or the timer expires, the UE 102 may be released from acting as the anchor in assisting the UE 124 in sidelink resource allocation. The release procedure, as described below in several examples, may be initiated by the UE 124 or the UE 102. In general, a release message may be sent from one UE to the other UE. The release message may further include an indication of the cause for the release. The cause may include time expiration or any one of the triggering conditions above. The other UE receiving the release message may send a response message.

Once the UE 102 is released from acting as the anchor UE for the UE 124, various options may be provided as to the sidelink resources already allocated to the UE 124 by the UE 102. For example, UE 124 may not be allowed to continue using the sidelink resources previously allocated by the released UE 102. For another example, and to promote sidelink service continuity, the UE 124 may be allowed to continue using the sidelink resources previously allocated by the UE 102 even if the UE 102 has been released from the anchor role. Alternatively, the UE 124 may be allowed to use resources from some emergency or exceptional sidelink resource pool in place of the sidelink resource previously allocated by the released UE 124. Correspondingly, the release message or some other message to the UE 124 may include an indicator for indicating whether or not the UE 124 can continue to use the sidelink resources previously allocated by the released UE 102.

In some implementations, the UE 124 may initiate a release of UE 102 from acting as the anchor UE for the UE 124. An example is shown in the logic flow 400 of FIG. 4. In 410, the UE 124 determines an indication that one or more release conditions have been triggered and that the UE 102 is not to continue acting as the anchor UE in assisting the UE 124 in sidelink resource allocation. The release conditions may include at least one of:

the release timer has expired, the UE 124 has entered an RRC sidelink connection state, the UE 124 receives a configuration information from its serving sell indicating that the sidelink resources for the UE 124 is to transmit sidelink communication based on network scheduling by, e.g., its serving sell, the UE 124 receives a configuration from its serving cell indicating that it is to transmit sidelink communication based on autonomous resource selection of the UE 124, the UE 124 receives a configuration information from its serving sell indicating that it is no longer allowed to use other UEs to assist in allocating sidelink resources or its sidelink resource allocation is not to be provided by other UEs, a number of transmission reaches a maximum number of retransmission at the UE 124, the UE 124 satisfying at least one of a set of wireless communication environmental conditions.

The initial time value of the release timer and the maximum number of retransmission may be configured in the UE 124 by its serving cell or may be configured by the UE 102. The release timer may be restarted or the number of retransmission may be incremented by one by the UE 124 when a side scheduling request or a sidelink buffer status report is transmitted by the UE 124, or when a sidelink UE information or a sidelink UE assistant information is transmitted by the UE 124. The release timer may be stopped or the number of transmission may be set to zero when the UE 124 receives a sidelink resource allocation information from the UE 102.

The set of wireless communication environmental conditions above may include but are not limited:

the UE 124 enters a cellular coverage (when it not previously covered by a cell), a channel quality between the UE 124 and the UE 102 is less than a first channel quality threshold value, a distance between the UE 124 and the UE 102 larger than a second distance threshold value, the UE 124 detects that the CBR of the allocable sidelink resource pool is lower than a third CBR threshold value, the UE 124 leaves a sidelink communication group to which the UE 102 belongs, the UE 124 identifies another UE more suitable for acting as the anchor UE to assist the UE 124 in sidelink resource allocation (more details are provided below in relation to the fifth embodiment).

Figure 4:
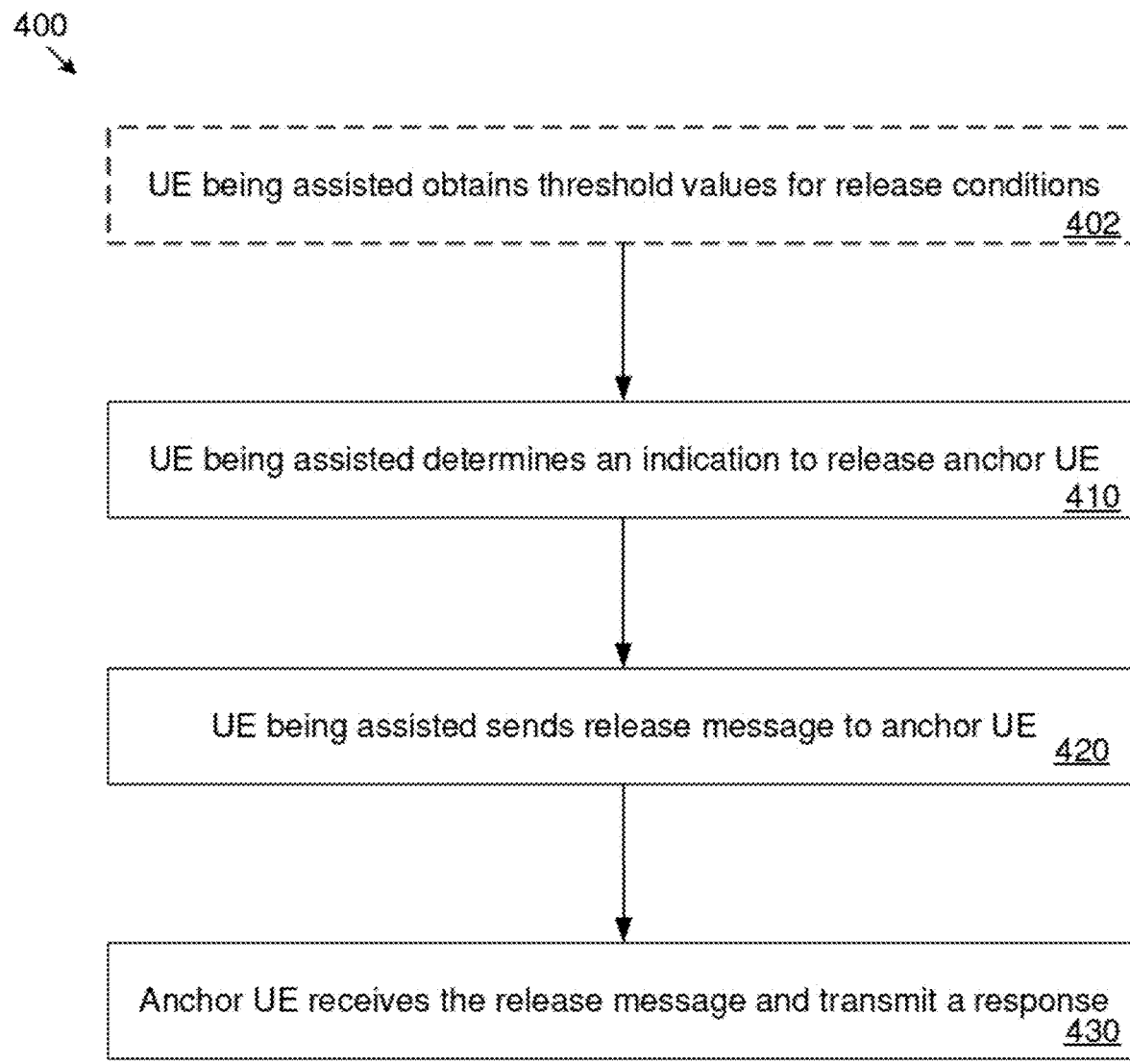
FIG. 4 illustrates an example logic flow for releasing an anchor UE from assisting a second UE in sidelink resource allocation as initiated by the anchor UE.

As shown in 420 of FIG. 4, once the one or more release condition is triggered in 410 of FIG. 4, the UE 124 sends a release message to the UE 102. The release message is used to indicate to the UE 102 that the UE 102 is released and is no longer responsible for acting as the anchor UE for assisting the UE 124 in sidelink resource allocation. Depending on the cause of the release (determined by the various triggers above), the release message may be used to alternatively to indicate to the UE 102 that a mode for sidelink resource allocation mode for UE 124 has changed (e.g., from UE assisted to allocation by a serving cell).

The release message may optionally include an indication of cause(s) of the release. In correspondence with the release triggers above, the release cause(s) may include one or more of:

release timer expiry, a change of a RRC connection status;

a change of a mode of sidelink resource allocation;

a first channel quality degradation between the first UE and its serving cell;

a second channel quality degradation between the first UE and the second UE;

a low channel busy ratio (CBR) of configured sidelink resources pool is detected;

leaving a sidelink communication group including the second UE; or a determination by the first UE to switch to a third UE as the anchor UE to assist the first UE in the sidelink resource allocation. Optionally, the release message may include an indicator for indicating whether or not the UE 124 is to continue to use the sidelink resources previously allocated by the released anchor UE 102.

Optionally, the release procedure 400 may further include step 430 of FIG. 4, in which the anchor UE 102 receives the release message and transmit a response to the UE 124 to acknowledge the release of the UE 102 from acting as the anchor UE for assisting the UE 124 in sidelink resource allocation.

In some implementations, the release procedure 400 may further include step 402 prior to the step 410 where the release condition is determined by the UE 124. In particular, in step 402, the UE 124 may first obtain the various threshold values described above for triggering the release, including but not limited to the first channel quality threshold value, the second distance threshold value, and the third CBR threshold value These threshold values may be obtained by the UE 124 from its serving cell. Alternatively, these threshold values may be pre-configured in the UE 124.

In some other example implementations, the anchor UE 102 rather than the UE 124 may initiate the release of UE 102 from acting as the anchor UE for the UE 124. An example is shown in the logic file 500 of FIG. 5. In 510, the UE 102 determines that it is no longer responsible for assisting the UE 124 in sidelink allocation. The UE 102 may decide to release itself from acting as an anchor UE for the UE 124 under various example conditions. For example, a serving cell of the UE 102 may send a configuration message to the UE 102 to indicate to the UE 102 that the UE 124 is to obtain sidelink resource allocation by choose resources by itself (or that UEs are to transmit sidelink communication based on autonomous resource selection). For another example, the serving cell of the UE 102 may send a configuration message to the UE 102 to indicate to the UE 102 is no longer permitted to assist other UEs in sidelink resource allocation. For yet another example, the UE 102 may determine one or more other release triggers are satisfied. These release triggers may include but are not limited to:

a channel quality between UE 102 and its serving cell is less than a first channel quality threshold value, a current load rate of UE 102 is higher than a second load rate threshold value;

the UE 102 detects that a CBR of allocable sidelink resource pool is above a third CBR threshold value;

the channel quality between the UE 102 and the UE 124 is less than a fourth channel quality threshold value, a distance between the UE 102 and the UE 124 is greater than a fifth distance threshold value, the UE 102 leaves a sidelink communication group to which the UE 124 belongs, the UE 102 cease to be a head UE of a sidelink communication group to which the UE 124 belongs.

Figure 5:
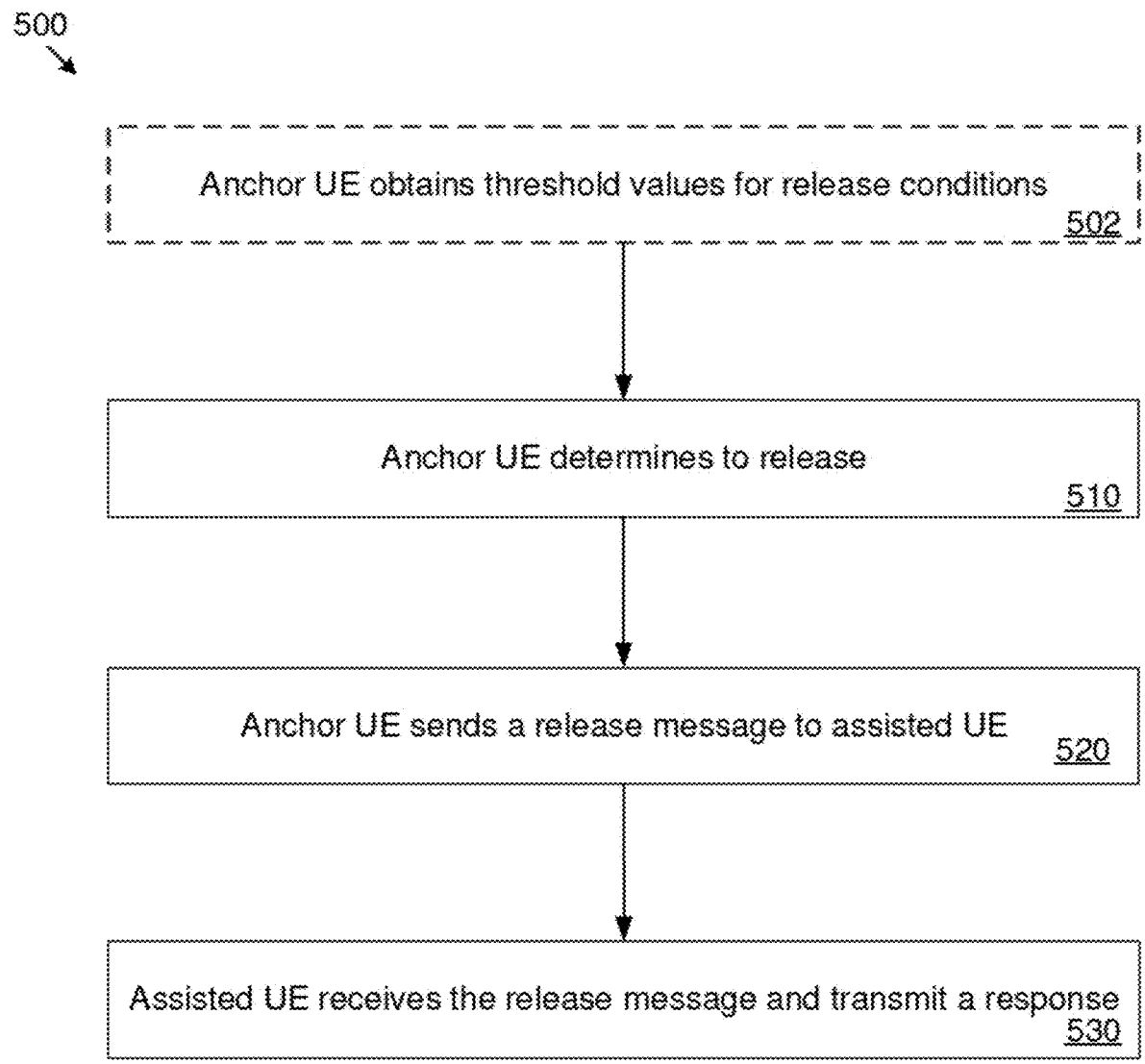
FIG. 5 illustrates an example logic flow for releasing an anchor UE from assisting a second UE in sidelink resource allocation as initiated by the anchor UE.

As shown in FIG. 5, the release procedure 500 further include step 520, in which the anchor UE 102 sends a release message to the UE 124. The release message may be used to indicate to the UE 124 that the UE 102 is no longer to service as the anchor UE in assisting the UE 124 in sidelink resource allocation. In correspondence to the triggers leading to the release, the release message may include one of more causes for the release. The causes may include but are limited to:
channel quality deterioration,
change of an RRC connection status,
changes in mode of resource acquisition,
UE 102 leaving the sidelink communication group,
UE 102 ceasing to act as head UE of the sidelink communication group,
high current load rate,
high CBR,
large distance between the UE 102 and UE 124,
The channel deterioration cause above may include either deterioration of the channel quality between the UE 102 and its serving cell or the channel quality between the UE 102 and the UE 124.

As further shown in FIG. 5, the release procedure 500 may further include step 530 in which the UE 124 receives the release message from the UE 102 and respond to acknowledge the release of the UE 102 from acting as the anchor UE in assisting the UE 124 in sidelink resource allocation.

Optionally, the release message transmitted by the UE 102 may include an indicator for indicating to the UE 124 whether or not the UE 124 can continue to use the sidelink resources previously allocated by the released anchor UE 102.

In some implementations, the release procedure 500 may further include step 502 prior the step 510 where the release condition is determined by the UE 102. In particular, in step 502, the UE 124 may first obtain the various threshold values described above for triggering the release, including but not limited to the first channel quality threshold value, the second load rate threshold value, the third CBR threshold value, the fourth channel quality threshold value, the fifth distance threshold value. These threshold values may be obtained by the UE 102 from its serving cell. Alternatively, these threshold values may be pre-configured in the UE 102.

Fourth Embodiment (Selecting Head UE as the Anchor UE)

In some implementations, the UE 102 and the UE 124 may belong to a same sidelink group-cast group. The UE 102 may particular be configured as the head UE of the group-cast group. When the UE 102 needs assistance in sidelink allocation, it may select the head UE as the anchor UE. For example, the UE 124 may first identify the head UE among the group via signaling exchange with its serving cell and/or other UEs in the sidelink group-cast group. It may then request and establish the head UE 102 to serve as the anchor UE in assisting it in sidelink resource allocation. When either of the UE 102 or UE 124 (as the head UE and the anchor UE) leaves the sidelink group-cast group, the UE 124 may be released from acting as the anchor UE for the UE 102 either at the initiation of the UE 124 or at the initiation of the UE 102, as described above in the third embodiment.

Fifth Embodiment (Switching to Anchor UE)

For the UE 124 being currently assisted by the anchor UE 102 in sidelink resource allocation, and when the UE 102 has not been release from acting as the anchor UE, one or more other UEs may have become more qualified as acting as an anchor UE for the UE 102. The anchor UE for the UE 124 may be switched to one of the more qualified UEs. In some implementations, the UE 124 may send a scheduling request to a more qualified UE to request it to service as the anchor UE. After an acceptance and confirmation by the more qualified UE, the original assisting relationship between the UE 102 and the UE 124 may be released and the more qualified UE would replace the UE 102 as the anchor UE for assisting the UE 102 in sidelink resource allocation.

In some implementations, to avoid frequent switching of anchor UE and a resulting reduction in system efficiency, it may be required that a candidate anchor UE for the UE 124 to switch to be more qualified as an anchor UE than the UE 102 by at least a threshold improvement in at least some aspects, such as a channel quality with its serving cell, a channel quality with the UE 124, a load rate, a distance to the UE 124, and the like, as described in more detail below.

Figure 6:
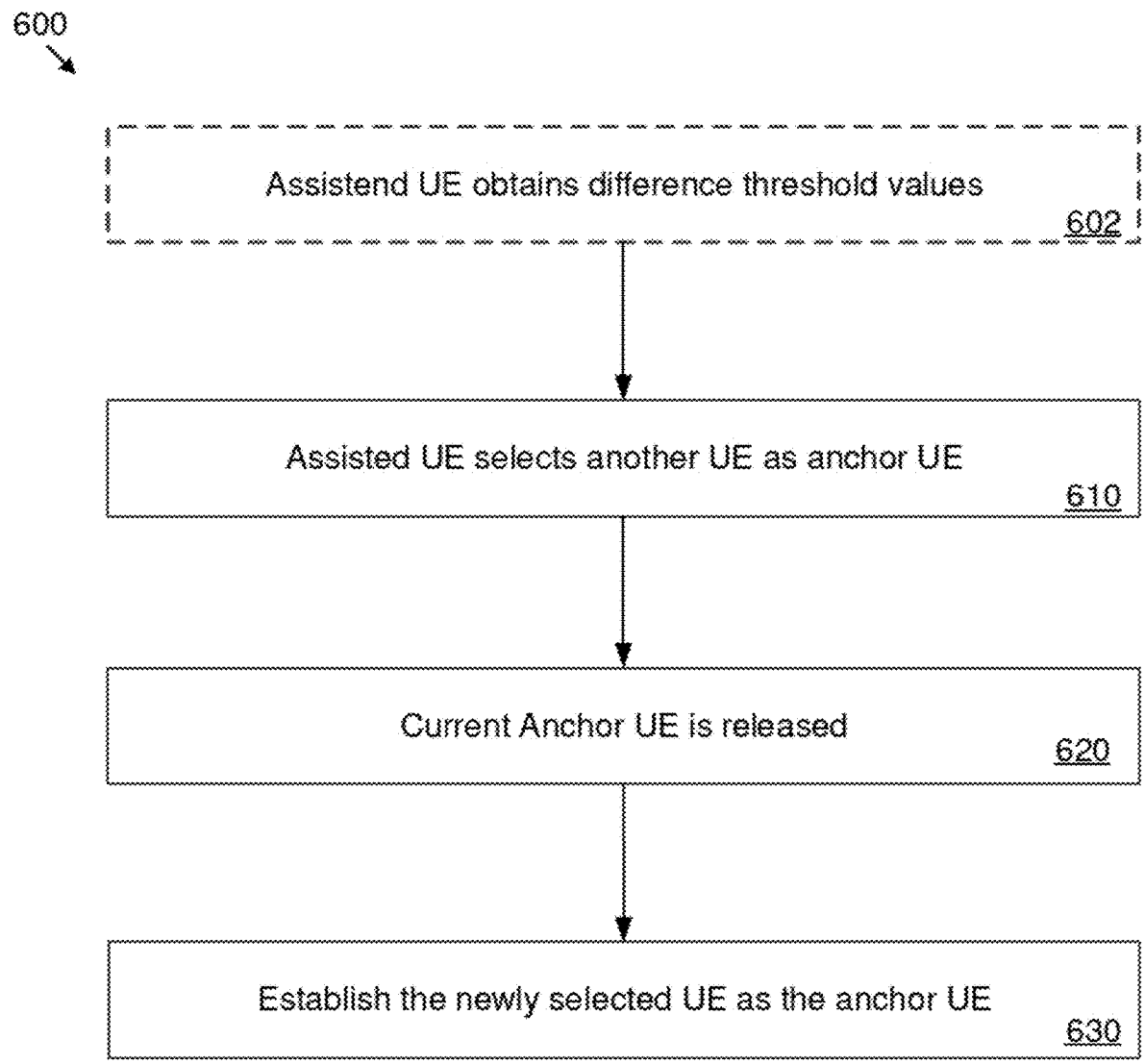
FIG. 6 illustrates an example logic flow for a UE to switch its anchor UE in assisting in sidelink resource allocation.

FIG. 6 shows an example logic flow 600 for switching anchor UE. In step 610, the UE being assisted in sidelink resource allocation, the UE 124, selects a UE other than the UE 102 as its anchor UE. In step 520, the assisted UE may initiate a release procedure to release the UE 102 from acting as the anchor UE in assisting the UE 124 in sidelink resource allocation by sending a release message to the UE 102. The release message is used to indicate to the UE 102 that it is no longer responsible for acting as the anchor UE for assisting the UE 124 in sidelink resource allocation. Example content of the release message and the release procedure thereafter may follow the description above in the third embodiment. In particular, the release message may include an indicator for indicating whether or not the sidelink resource previously allocated by the UE 102 is to be continued used for sidelink communication by the UE 124.

As further shown in 620 of FIG. 6, the current anchor UE 102 is released from its anchor role for the UE 124. The in 630, the assisting relationship between the newly selected UE and the UE 124 may be established and the newly selected UE may then act as the anchor UE for the UE 124. The procedure for establishing the newly selected UE as the anchor UE may follow the procedure described in the various embodiments above. The step 630 may be alternatively performed before step 620.

The criteria for the UE 124 in selecting the new anchor UE, or determining that the newly selected UE is more qualified than the UE 102 by at least some threshold may include at least one of:
a difference between a load rate of the UE 102 and a load rate of the new UE is greater than a first load rate difference threshold value,
a difference between a CBR of configured resource pool of the UE 102 and a CBR of configured resource pool of the new UE is greater than a second CBR difference threshold value,
a difference between a channel quality between the new UE and the UE 124 and a channel quality between the UE 102 and the UE 124 is greater than a third channel quality difference threshold value,
a difference between a channel quality between the new UE and its serving cell and a channel quality between the UE 102 and the serving cell of the UE 102 is greater than a fourth channel quality difference threshold value,
a difference between a distance between the UE 102 and the UE 124 and a distance between the new UE and the UE 124 is greater than a fifth distance difference threshold value.

Optionally, the various difference threshold above may be obtained by the UE 124 from its serving cell or may be pre-configured in the UE 124, as shown in 602 of FIG. 6.

Sixth Embodiment (Sidelink Resource Allocation by an Anchor UE When Assisting More Than One UEs)

In some implementations, one UE can serve as anchor UE for multiple other UEs. For example, the UE 102 of FIG. 1 may assist both UE 124 and UE 126 in sidelink resource allocation. In some situations, the UE 102 may allocate the sidelink resources to UE 124 and UE 126 in the aggregate. The UE 124 and UE 126 may then select from the allocated sidelink resources for sidelink transmission. For example, UE 124 and UE 126 may be allowed to randomly select from the allocated resources. As such, resource selection collision may occur between UE 124 and UE 126. To avoid resource selection collision, the UE 124 and the UE 126 may performing sensing of the resources prior to making any selection.

In some other implementations, the UE 102 may act as anchor UE for both the UE 124 and the UE 126 and may allocate separate resources for the UE 124 and the UE 126. As such, the UE 124 and the UE 126 may each select from the allocated resources, e.g., randomly, without having to performing sensing to avoid resource selection collision. However, because the UE 102 may not be aware of the resource need for the UE 124 and the UE 126, such separate allocation of sidelink resources for the UE 124 and the UE 126 may be sometimes either over-allocated or under-allocated, leading to reduction of sidelink resource utilization efficiency.

In yet some other implementations as described in more detail below, the UE 102 may allocate resources to a particular assisted UE such as the UE 124. The allocation may include a sharing indicator to indicate to the UE 124 whether the resources included in the allocation are shared with any other UEs. The UE 124 may then determine whether or not to perform resource sensing prior to selecting resources from the allocation. For example, if the sharing indicator indicates that the allocated resources are shared with other UEs, then the UE 124 may need to perform sensing prior to selection of resources from the allocation in order to avoid resource selection collision with the other UEs. However, if the sharing indicator indicates that the resource allocation is not shared with other UEs, then the UE 124 may perform random resource selection from the allocation without having to perform sensing.

Such implementations provide flexibility in using the anchor UE 102 to assist in resource allocation for multiple UEs. For example, the UE 102 may use a mixed type of resource allocation. Specifically, the UE 102 may allocate separate non-shared resources to some UEs (if, for example, the UE 102 can estimate or have other ways of knowing an approximate resource need for these UEs), while allocating shared resources to some other UEs. The UE 102 only needs to provide an allocation information to each assisted UE with an indicator indicating whether or not the resources with the allocation for the particular UE are shared with any other UEs. Such indication may be provided at a granularity of the allocation level, or a granularity of resource level. For example, the UE 102 may include a single indicator that is applicable to the entire resource allocation for a particular assisted UE. Alternatively, the UE 102 may include multiple indicators in an allocation for a particular assisted UE to indicate whether different portions of the resources within the allocation are shared with other UEs.

Figure 7:
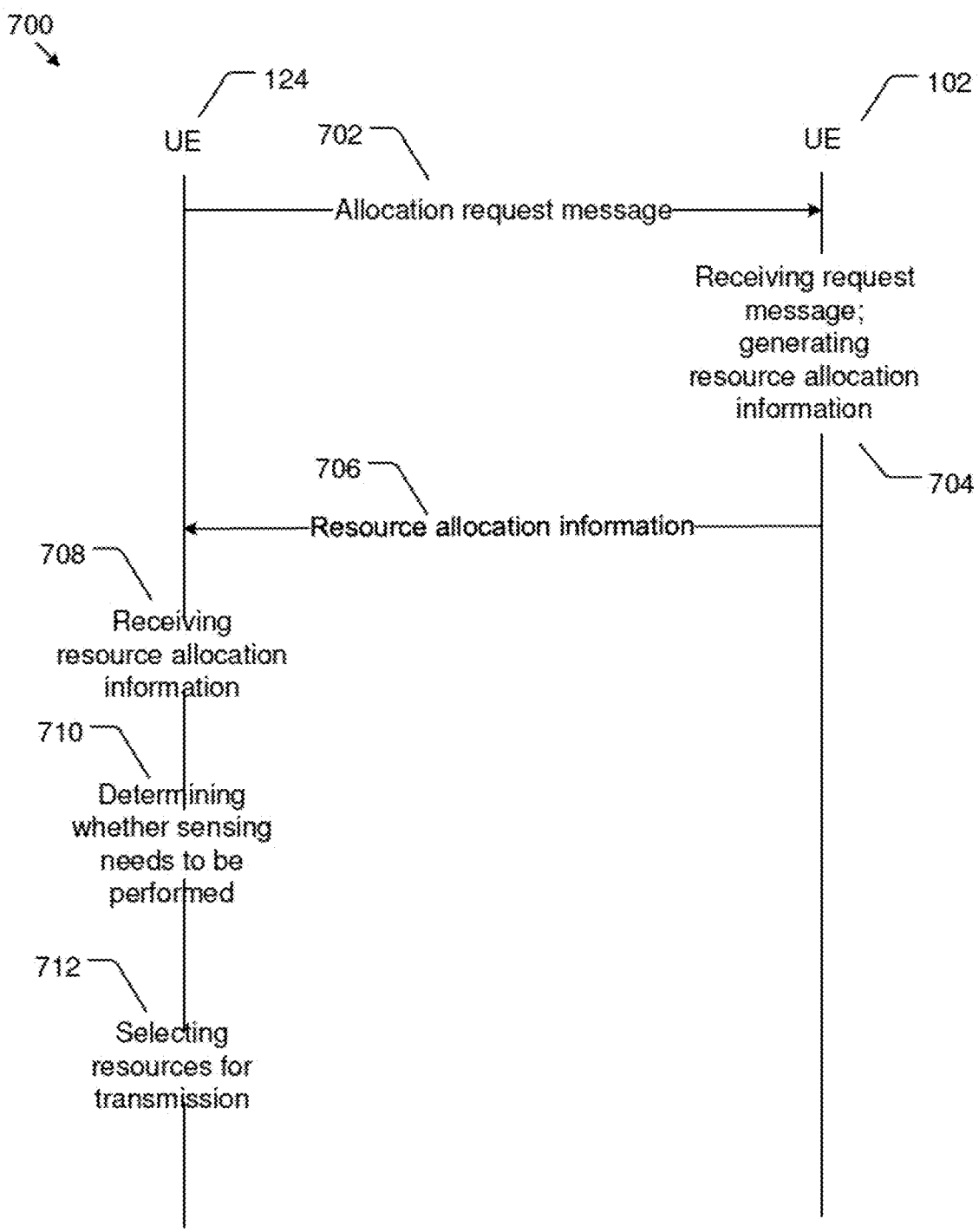
FIG. 7 illustrates another example logic flow for an anchor UE to assist a second UE in sidelink resource allocation.

FIG. 7 shows an example logic flow 700 for allocating sidelink resources by the anchor UE 102 to the assisted UE 102 while also assisting other UEs in sidelink resource allocation. In step 701, the UE 124 sends a resource allocation request message to the anchor UE 102. The allocation request message may be transmitted via a PC5 RRC interface or a PC5 MAC CE interface, or a sidelink control information interface. The allocation request message my include at least one of:
  Resource allocation assistant information for the UE 124,
  sidelink information for the UE 124,
  BSR of the UE 124,
  UE 124's resource allocation request.
The Resource allocation assistant information may include at least one of:
  a traffic periodicity,
  a timing offset,
  a message size,
  a sidelink destination index,
  a sidelink quality of service (QoS) flow identity.
The sidelink information may include at least one of:
  an information list of interested frequency points,
  a destination identity,
  a transmission cast type,
  a sidelink QoS information list comprising at least one of a QoS flow identity or QoS profile index.

As shown in FIG. 7 in step 704, the UE 102 receives the allocation request message and generate resource allocation information. In step 706, the UE 102 sends the resource allocation information to the UE 124. In step 708, the UE 124 receives the resource allocation information. The resource allocation information may include at least one of:
  Usable/available sidelink resource allocation,
  unusable/unavailable sidelink resource allocation,
  a sharing indicator,
  a mode for selection of the allocated resources by the first UE.

The sharing indicator above is included to indicate whether or not the available sidelink resources allocated by the UE 102 are shared with at least one other UEs. If the available resources are shared, the UE 124 needs to perform sensing before selecting sidelink resources from the available sidelink resources to reduce collision with other UEs assisted by the UE 102. If the available resources are indicated as not being shared, the UE 124 may randomly select from the available resources without performing sensing. Correspondingly, the mode for selection included in the resource allocation information above may include one of a sensing mode or a random selection mode.

As shown in 710 of FIG. 7, the UE 124 may then determine whether sensing is required based on the sharing indicator and/or the selection mode in the received resource allocation information from the UE 102. At step 712, the UE 124 perform selection of resources for sidelink transmission, for example, either randomly or after sensing.

Optionally, before step 702, the UE 124 may first detect whether or not the CBR of the sidelink resource pool is lower than a CBR threshold. The UE 124 may obtain such CBR threshold from its serving cell or from the UE 102 or such CBR threshold may be pre-configured in the UE 124.

In some other implementations, the procedure 700 of FIG. 7 may be further enhanced to include resource allocation limitation imposed by a serving cell. As such, some additional resource allocation information may be needed from the UE 124. Such additional resource information may include but is not limited to a BSR of the UE 124, or other resource allocation assistant information of the UE 124 described above. For example, the UE 124 may send its sidelink BSR to the anchor UE 102 for further limiting the sidelink resource allocation. If the current BSR is the same as the original BSR, the UE 124 may need to send to the anchor UE 102 priority information for logic channels or a logic channel group, or the UE 102 may directly configure logic channels or logic channel group for the UE 124. For example, the UE 102 may configure a mapping between logic channel group and QoS levels. For another example, the UE 124 may configure the logic channels or logic channel group and transmit the priority information for such logic channels or logic channel group to the UE 102.

A logic flow for such implementations is similar to the logic flow 700 of FIG. 7, with some additional steps before the step 702. For example before step 702, the assisted UE 124 may first receive a configuration of logic channels or a logic channel group from the anchor UE 102. Such a configuration indicates QoS information corresponding to each of the logic channels or logic channel group. Alternatively, the UE 124 may first communicate logic channel or logic channel group information to the UE 124. The information indicates QoS information corresponding to each of the logic channels or logic channel group. The QoS information may include but is not limited to one or more of, for example, priority information, a resource type (GBR, delay critical GBR or Non-GBR), QoS flow identity (QFI), QoS control information (QCI), packet delay information, or reliability information.

Seventh Embodiment (Simplified Buffer Status Report)

In some alternative implementations of the sixth embodiment, the BSR information may be simplified. For example, the anchor UE 102 may only need to report buffer size for each packet priority (PPPP) or buffer size per QoS list for assisting the UE 124 in sidelink resource allocation. Further, if the anchor UE 102 needs to assist allocating all sidelink traffic resources for the assisted UE 124, it may also need information such as service destination index. The QoS list and the service destination index above may need to be provided to the anchor UE 102 prior to sidelink resource allocation.

As such, in step 702 of the logic flow 700 in FIG. 7, the allocation request message sent from the UE 124 may include one or more priority information and buffer sizes corresponding to the one or more priority information. Additionally or alternatively, the allocation request message may include one or more QoS information and buffer sizes corresponding to the one or more QoS information. Optionally, the allocation request message may further include service destination index. Correspondingly, before the step 702 of the logic flow 700 in FIG. 7, the assisted UE 124 may send a list of QoS profiles of sidelink QoS flows to the anchor UE 102. The QoS information above may include one or more of QoS index for identifying specific QoS profiles in the list of QoS profiles. An example list of QoS profiles is shown in List 1 below and explained in Table 1 below.

List 1

```
sl-QoS-InfoList       SEQUENCE (SIZE (1..maxNrofSL-QFIsPerDest)) OF SL-QoS-Info
SL-QoS-Info ::=       SEQUENCE {
    sl-QoS-FlowIdentity        SL-QoS-FlowIdentity,
    sl-QoS-Profile             SL-QoS-Profile              OPTIONAL
}
SL-QoS-Profile ::=    SEQUENCE {
    sl-PQI                     SL-PQI                      OPTIONAL,
    sl-GFBR                    INTEGER (0..4000000000)     OPTIONAL,
    sl-MFBR                    INTEGER (0..4000000000)     OPTIONAL,
    sl-Range                   INTEGER (1..10000)          OPTIONAL,
    ...
}
SL-PQI ::=            CHOICE {
    sl-StandardizedPQI         INTEGER (1..83),
    sl-Non-StandardizedPQI     SEQUENCE {
        sl-ResourceType            ENUMERATED {gbr, non-GBR, delayCriticalGBR,
spare1} OPTIONAL,
        sl-PriorityLevel           INTEGER (0..7)              OPTIONAL,
        sl-PacketDelayBudget       INTEGER (0..1023)           OPTIONAL,
        sl-PacketErrorRate         INTEGER (0..9)              OPTIONAL,
        sl-AveragingWindow         INTEGER (0..4095)           OPTIONAL,
        sl-MaxDataBurstVolume      INTEGER (0..4095)           OPTIONAL,
        ...
    }
}
```

TABLE 1 sl-QoS-InfoList
Includes the QoS profile of the sidelink QoS flow.
sl-QoS-FlowIdentity
This identity uniquely identifies one sidelink QoS flow between the UE and the network in the scope of UE, which is unique for different destination and cast type.
    SL-QoS-Profile field descriptions
sl-GFBR
Indicate the guaranteed bit rate for a GBR QoS flow. The unit is: Kbit/s
sl-MFBR
Indicate the maximum bit rate for a GBR QoS flow. The unit is: Kbit/s
sl-PQI
This filed indicates either the PQI for standardized PQI or non-standardized QoS parameters.
sl-Range
This field indicates the range parameter of the Qos flow.
    SL-PQI field descriptions sl-Averaging Window
Indicates the Averaging Window for a QoS flow, and applies to GBR QoS flows only. Unit: ms. The default value of the IE is 2000 ms.

TABLE 1-continued sl-MaxDataBurstVolume
Indicates the Maximum Data Burst Volume for a QoS flow, and applies to delay critical GBR QoS flows only. Unit: byte.
sl-PacketDelayBudget
Indicates the Packet Delay Budget for a QoS flow. Upper bound value for the delay that a packet may experience expressed in unit of 0.5 ms.
sl-PacketErrorRate
Indicates the Packet Error Rate for a QoS flow. The packet error rate is expressed as Scalar × 10−k where k is the Exponent.
sl-PriorityLevel
Indicates the Priority Level for a QoS flow. Values ordered in decreasing order of priority, i.e. with 1 as the highest priority and 127 as the lowest priority.
sl-StandardizedPQI
Indicate the the PQI for standardized PQI.

Eighth Embodiment (Scheduling Request)

In some other alternative implementations to the sixth embodiment above, the BSR may not be included in the allocation request message of step 702. The allocation request may only be made via scheduling request (SR). Different scheduling request configuration may correspond to the level of size of resource allocations. The anchor UE 102 may transmit one or more SR configuration information to the assisted UE 124. The one or more SR configuration information may be used by the assisted UE 124 in requesting sidelink resource allocation.

The SR configuration information may be requested by the anchor UE 102 from its serving cell. For example, the serving cell may be configures with a scheduling request list. The anchor UE 102 may determine a SR configuration information for a particular assisted UE such as the UE 124.

As such, in these implementations, the resource allocation request message of step 702 of FIG. 7 may include one or more SRs each corresponding to different priority information. Each SR carries separate buffer size information.

Correspondingly, before such a modified step 702, the assisted UE 124 may first receive SR configuration information, including a list of SR configurations. The assisted UE 124 may select SR configuration information from the list of SR configurations for configuring the assisted UE 124.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method for releasing resource allocation assistance in wireless sidelink communication by a first user equipment (UE), comprising:
    determining, after an association between the first UE and a second UE is established for the second UE to assist the first UE in sidelink resource allocation, a release indication indicating that the first UE no longer needs the second UE to assist in the sidelink resource allocation; and
    transmitting, upon the determination of the release indication, a release information to the second UE for indicating to the second UE that the first UE no longer need the second UE to assist in the sidelink resource allocation or that a mode for the sidelink resource allocation for the first UE has changed.

2. The method of claim 1, wherein the release indication is determined based on a release condition comprising at least one of:
    expiry of a timer established by the first UE;
    entering into a radio resource control (RRC) connected states by the first UE;
    receiving a configuration by the first UE from its serving cell indicating that the first UE is to transmit sidelink communication based on network scheduling, that the first UE is to transmit sidelink communication based on autonomous resource selection of the first UE, or that the sidelink resource allocation is not to be provided by other UEs;
    a number of transmissions reaching a maximum number of transmissions at the first UE; or
    a sidelink communication environment of the first UE satisfying a predetermined level.

3. The method of claim 2, wherein an initial time value of the timer or the maximum number of transmissions is configured in the first UE by its serving cell or is pre-configured or is configured by the second UE.

4. The method of claim 3, wherein the timer is restarted or the number of transmissions is incremented by one by the first UE when:

a sidelink scheduling request or a sidelink buffer status report is transmitted by the first UE; or when a sidelink UE information or a sidelink UE assistant information is transmitted by the first UE.

5. The method of claim 4, wherein the timer is stopped or the number of transmissions is set at zero when the first UE receives a sidelink resource allocation information from the second UE.

6. The method of claim 4, further comprising:
releasing, by the first UE, the association between the first UE and the second UE; or
releasing, by the first UE, the second UE as an anchor UE for the first UE in the sidelink resource allocation.

7. The method of claim 2, wherein a sidelink communication environment of the first UE satisfying a predetermined level comprises at least one of:
entering a cellular coverage by the first UE;
a channel quality between the first UE and the second UE being below a first channel quality threshold value;
a distance between the first UE and the second UE being larger than a second distance threshold value;
a channel busy ratio (CBR) of configured sidelink resources pool as being lower than a third CBR threshold value;
the first UE leaving a sidelink communication group including the second UE; or
determination by the first UE that a third UE is more suitable to serve as an anchor UE for the first UE for the sidelink resource allocation.

8. The method of claim 7, further comprising, prior to determining the release indication:
obtaining, by the first UE from its serving cell, the first channel quality threshold value, the second distance threshold value, or the third CBR threshold value; or
determining, by the first UE via pre-configuration, the first channel quality threshold value, the second distance threshold value, or the third CBR threshold value.

9. The method of claim 1, wherein the release information comprises a cause for release of the association between the first UE and the second UE comprising at least one of:
expiry of a timer;
a change of an RRC connection status;
a change of a mode of sidelink resource allocation;
a first channel quality degradation between the first UE and its serving cell;
a second channel quality degradation between the first UE and the second UE;
a lower channel busy ratio (CBR) of configured sidelink resources pool is detected;
leaving a sidelink communication group including the second UE; or
a determination by the first UE to switch to a third UE as an anchor UE to assist the first UE in the sidelink resource allocation.

10. The method of claim 1, wherein the release information further indicates whether or not a sidelink resource already allocated to the first UE by the second UE is to be continually used by the first UE for a sidelink communication after the second UE is released as an anchor UE for the first UE.

11. The method of claim 1, further comprising receiving by the first UE a response information transmitted by the second UE after the second UE receives the release information from the first UE.

12. The method of claim 1, wherein determining the release indication comprises identifying a third UE more suitable as an anchor UE for assisting the first UE in sidelink resource allocation.

13. The method of claim 12, wherein identifying the third UE comprises determining that the third UE is more suitable as the anchor UE for assisting the first UE in the sidelink resource allocation than the second UE by determining at least one of:
a difference between a load rate of the first UE and a load rate of the third UE is greater than a first load rate difference threshold value;
a difference between a CBR of configured resource pool of the first UE and a CBR of configured resource pool of the third UE is greater than a second CBR difference threshold value;
a difference between a channel quality between the third UE and the first UE and a channel quality between the second UE and the first UE is greater than a third channel quality difference threshold value;
a difference between a channel quality between the third UE and its serving cell and a channel quality between the second UE and the serving cell of the second UE is greater than a fourth channel quality difference threshold value; or
a difference between a distance between the second UE and the first UE and a distance between the third UE and the first UE is greater than a fifth distance difference threshold value.

14. The method of claim 13, wherein the first UE obtains the first load rate difference threshold value; the second CBR difference threshold value; the third channel quality difference threshold value; fourth channel quality difference threshold value, and the fifth distance difference threshold value from its serving sell or via pre-configuration.

15. The method of claim 12, the method further comprising, prior to transmitting the release information to the second UE:
transmitting a sidelink resource allocation assistance request to the third UE; and
receiving an acknowledgement from the third UE indicating that the third UE agrees to act as the anchor UE to assist the first UE in the sidelink resource allocation.

16. A method for wireless sidelink resource allocation for a first UE, comprising:
receiving, by the first UE, a sidelink configuration message indicating a plurality of modes of sidelink resource allocation that can be simultaneously used by the first UE; and
obtaining a sidelink resource allocation, by the first UE, via two or more of the plurality of modes of sidelink resource allocation,
wherein the plurality of modes of sidelink resource allocation comprise two or more of a mode for resource allocation by a serving cell, a mode for resource allocation by UE autonomous resource selection, or a mode for resource allocation via assistance from a second UE.

17. The method of claim 16, further comprising receiving, by the first UE:
an indication information for indicating PC5 RATs and simultaneous modes of sidelink resource allocation supported by each of the PC5 RATs; or
a cross RAT indication information for indicating simultaneous modes of sidelink resource allocation supported by cross RAT.

18. The method of claim 16, further comprising receiving, by the first UE a priority information indicating a relative priority among the plurality of modes of sidelink resource allocation.

19. A first UE comprising a processor and a memory, wherein the processor is configured to read computer code from the memory to cause the first UE to:
- receive a sidelink configuration message indicating a plurality of modes of sidelink resource allocation that can be simultaneously used by the first UE; and
- obtain a sidelink resource allocation, via two or more of the plurality of modes of sidelink resource allocation,
- wherein the plurality of modes of sidelink resource allocation comprise two or more of a mode for resource allocation by a serving cell, a mode for resource allocation by UE autonomous resource selection, or a mode for resource allocation via assistance from a second UE.

20. The first UE of claim 19, wherein the processor is further configured to execute the computer code to cause the first UE to receive:
- an indication information for indicating PC5 RATs and simultaneous modes of sidelink resource allocation supported by each of the PC5 RATs; or
- a cross RAT indication information for indicating simultaneous modes of sidelink resource allocation supported by cross RAT.

\* \* \* \* \*